United States Patent [19]

Kormer et al.

[11] 3,878,182

[45] Apr. 15, 1975

[54] METHOD FOR PREPARING CARBON-CHAIN LINEAR POLYMERS

[76] Inventors: Vitaly Abramovich Kormer, ulitsa Zheleznovodskaya 62, kv. 2; Tatyana Lvovna Jufa, ulitsa Tipanova 29, kv. 513; Boris Davidovich Babitsky, ulitsa Krasnogo Kursanta, 7, kv. 9; Viktoriya Vladimirovna Markova, ulitsa Bolotnaya 11, kv. 18; Mark Iosifovich Lobach, prospekt Annikova 28, kv. 52; Nikolai Fedorovich Kovalev, prospekt Veternaov 147, kv. 170; Irina Alexandrovna Poletaeva, ulitsa 3 Internatsionala 74, kv. 212; Nadezhda Pavlovna Simanova, ulitsa Kolomenskaya 22, kv. 57; Irina Moiseevna Lapuk, Narvsky prospekt 8, kv. 18; Galina Vasilievna Kholodnitskaya, 6 Sovetskaya ulitsa 28, kv. 12, all of Leningrad, U.S.S.R.

[22] Filed: Mar. 16, 1973

[21] Appl. No.: 341,951

[30] Foreign Application Priority Data
Mar. 16, 1972  U.S.S.R. ............................. 1757213

[52] U.S. Cl. ......... 260/93.1; 252/429 R; 252/431 N; 252/431 P; 252/431 R
[51] Int. Cl. .......... C08f 1/34; C08f 1/38; C08f 1/40
[58] Field of Search .................................... 260/93.1

[56] References Cited
UNITED STATES PATENTS

| | | | |
|---|---|---|---|
| 3,449,310 | 6/1969 | Dall'Asta et al. | 260/93.1 |
| 3,459,725 | 8/1969 | Natta et al. | 260/93.1 |
| 3,462,403 | 8/1969 | Pendleton | 260/93.7 |

*Primary Examiner*—Stanford M. Levin
*Attorney, Agent, or Firm*—Holman & Stern

[57] ABSTRACT

The method for preparing carbon-chain linear polymers consists in the bulk polymerization of alicyclic compounds containing from 4 to 12 carbon atoms and from 1 to 4 double bonds in the ring, or in an organic solvent medium, at a temperature of from $-50°$ to $+80°C$ in the presence of a catalyst consisting of transition metal compounds and compounds having the general formula $(AlH_bU_c)_d.f.P$, where U is a halogen or $NR_2$ where R is a hydrogen, alkyl, or an aryl having from 1 to 20 carbon atoms, P is an ether, or a tertiary amine having from 2 to 20 carbon atoms, $b$ is from 1 to 2, $c$ is $3-b$, $d$ is from 1 to 50 and $f$ is from 0 to $d$.

1 Claim, No Drawings

METHOD FOR PREPARING CARBON-CHAIN LINEAR POLYMERS

This invention relates to methods for preparing carbon to carbon-chain linear polymers, and more particularly it relates to methods for preparing carbon-chain linear polymers which are formed by the polymerization of alicyclic compounds by opening the ring, in the presence of catalytic systems based on compounds of the transition metals and of aluminium compounds.

Said polymers are very important substances in the manufacture of tires and other rubber goods, since vulcanizates are basically characterized by high physicomechanical properties, elasticity and frost-resistance.

A method for preparing carbon-chain linear polymers by the bulk polymerizing alicyclic compounds which involves opening the ring at a temperature of from −50° to +80°C, or in an organic solvent medium, and in the presence of catalysts based on aluminium compounds (See U.S. Pat. No. 3,449,310), and consisting of polymerizing in the presence of salts of metals from groups IV, V and VI of the Periodic System in combination with organometal compounds or hydrides of elements of groups I, II and III from the Periodic System.

The main disadvantage inherent in this method is the low activity of the catalysts, which results in low product yields.

Moreover, the polymerization of alicyclic compounds in the presence of the said catalysts is characterized by a considerable induction period when the process is carried out in the presence of a solvent. At the same time, carrying out the polymerization process by bulk polymerization of the monomer reduces the induction period, but makes the process more complicated due to the difficulties in controlling the process temperature and the molecular weight of the formed polyalkenamers, and furthermore, monomer losses are increased.

The object of the present invention is to provide a method for preparing carbon-chain linear polymers which would increase the yield of the product.

Another object of the invention is to increase the rate of the reaction of the polymerization in the presence of a solvent.

In accordance with these and other objects, the invention consists of bulk polymerizing alicyclic compounds containing from 4 to 12 carbon atoms and having from 1 to 4 double bonds in a ring, and which is carried out, or in the medium of an organic solvent at a temperature of from −50° to +80°C in the presence of a catalyst comprising compounds of the transition metals and aluminium compounds.

According to the invention the aluminium compounds have the general formula $(AlHbUc)d.f.P$, where U is a halogen, or an $NR_2$ where R is hydrogen, alkyl or aryl having from 1 to 20 carbon atoms, P is an ether or a tertiary amine having from 2 to 20 carbon atoms, $b$ is a number of from 1 to 2, $c$ is $3 - b$, $d$ is a number from 1 to 50 and $f$ is from 0 to $d$.

The method for preparing the carbon-chain linear polymers with the use of such catalysts is characterized by high yields of the main product (to 70 percent) and with considerable higher polymerization reaction rates which are not decreased in the presence of a solvent, all of which makes such a method for preparing the carbon-chain linear polymers very simple and efficient.

The proposed method is realized as follows.

The polymerization of alicyclic compounds is carried out in an inert atmosphere in the presence of the said catalysts at temperatures of from −50° to +80°C in a solution of aliphatic, alycyclic, or aromatic hydrocarbons, their ethers, or their halogen derivatives, or by polymerizing the monomer in bulk.

Substituted and non-substituted alicyclic compounds containing from 4 to 12 carbon atoms and having from 1 to 4 double bonds in a ring are used as the monomers.

Alkyl-, aryl-, aralkyl-, alkaryl-, acyl-, alkoxy-, cyano-, carbalkoxy-, aryloxy-, acyloxy-, aryloxy-groups and atoms of the halogens can be used as substitutes of hydrogen atoms in ring for the alicyclic compounds. One or more of such groups and atoms can be present in the ring of the alicyclic compounds.

The compounds of the transition metals of groups V - VIII of the Periodic System have the general formula $M \cdot nXmYpZq$, where M is a transition metal, $x$, $Y$ and $Z$ are halogen, NO, CO, $PR_3$, $P(OR)_3$, OR, $C_5H_5N$, $C_5H_5$, $C_6H_6$, $C_8H_{12}$ (R is alkyl, or aryl having from 1 to 20 carbon atoms, or a halogen), $n$ is from 1 to 4, and $m,p,q$ are from 0 to 8.

The alanes have the general formula $(AlHbUc)d \cdot f \cdot P$, where U is a halogen or $NR_2$ (R is hydrogen, alkyl or aryl having from 1 to 20 carbon atoms), P is an ether or a tertiary amine having from 2 to 20 carbon atoms, $b$ is a number of from 1 to 2, $c$ is $3 - b$, $d$ is a number of from 1 to 50 and f is from 0 to $d$.

The catalyst is prepared both in the presence and in the absence of the monomer. The molar ratio of Al to the transition metal is selected to be within a range of from 0.1 to 30. The molar ratio of the monomer to the transition metal is selected to be within a range of from 100 to 10,000. The polymerization process is continued for from 0.1 to 20 hours. The formed polymer can be isolated by any known method, for example, by precipitating same from alcohol. The prepared polymer is used in the manufacture of rubber mixtures and vulcanizates of their base.

For a better understanding of the invention it is illustrated by examples of its practical embodiment.

Example 1

A glass ampoule having a 50 ml capacity and an atmosphere of argon, is filled with solutions of a complex of dichloroalane along with triethylamine ($4 \cdot 10^{-4}$ mole) in 10 ml of toluene and tungsten hexachloride ($2 \cdot 10^{-4}$ mole) in 15 ml of toluene. Then, 5.3 g of cyclopentene are added. The polymerization is continued for 2 hours at a temperature of 30°C. The yield of the polymer is 3.4 g, which is 63 percent of theory. The polymer contains 72 percent of the trans-, and 28 percent of the cis- units. The intrinsic viscosity of the polymer ($\eta$) in benzene at 25°C is 3.10 dl/g.

Example 2

A glass ampoule having a 50 ml capacity, and an atmosphere of argon, is filled with solutions of a complex of iodoalane with diethyl ether ($3 \cdot 10^{-4}$ mole) in 10 ml of chlorobenzene and tungstene hexafluoride ($2 \cdot 10^{-4}$ mole) in 20 ml of chlorobenzene.

Then, 11.2 g of cyclooctene are added. The polymerization process is carried out for 5 hours at a temperature of 20°C. The yield of the polymer is 8.9 g which is 71 percent of theory. The polymer contains 95 percent of the trans-, and 5 percent of the cis units. The intrinsic viscosity of the polymer ($\eta$) in benzene at 25°C is 2.87 dl/g.

Example 3

A glass ampoule having a 50 ml capacity, and an atmosphere of argon, is filled with solutions of a complex of dibromoalane with diethyl ether ($3.2 \cdot 10^{-4}$ mole) in 10 ml of diethyl ether and tungsen hexacarbonyl ($2 \cdot 10^{-4}$ mole) in 15 ml of diethyl ether.

Then, 8.8 g of cyclooctadiene are added and the polymerization is continued for three hours at a temperature of 25°C. The yield of the polymer is 3 g, which is 34 percent of theory. The polymer contains the theoretical quantity of double bonds. The intrinsic viscosity of the polymer ($\eta$) in benzene at 25°C is 2.15 dl/g.

Example 4

A glass ampoule having a 50 ml capacity, and an atmosphere of argon, is filled with solutions of a complex of diiodoalane with tributylamine ($3.4 \cdot 10^{-4}$ mole) in 10 ml of cyclohexane, and molybdenum pentachloride ($2 \cdot 10^{-4}$ mole) in 25 ml of cyclohexane.

Then, 9.4 g of norbornene are added and the polymerization is continued for 16 hours at a temperature of 0°C. The yield of the polymer is 4.8 g, which is 51 of theory. The polymer contains the theoretical quantity of double bonds. The intrinsic viscosity of the polymer ($\eta$) in benzene at 25°C is 1.85 dl/g.

Example 5

A glass ampoule having a 50 ml capacity, and an atmosphere of argon, is filled with solutions of a complex of chloroalane with trimethylamine ($2 \cdot 10^{-4}$ mole) in 10 ml of benzene, and tungsteneoxychloride ($2 \cdot 10^{-4}$ mole) in 15 ml of benzene.

Then, 14.4 g of 5-methylcyclododecatriene are added and the polymerization reaction is continued for 5 hours at a temperature of 50°C. The yield of the polymer is 7.9 g, which is 55 percent of theory. The polymer contains the theoretical quantity of double bonds. The intrinsic viscosity ($\eta$) in benzene at 25°C is 2.35 dl/g.

Example 7

A glass ampoule having a 50 ml capacity, and an atmosphere of argon, is filled with solutions of poly(N-butylaminoalane) ($3.4 \cdot 10^{-4}$ mole) in 10 ml of chlorobenzene and rhenium pentachloride ($2 \cdot 10^{-4}$ mole) in 20 ml of chlorobenzene.

Then, 9 g of norbornene are added and the polymerization is carried out for 5 hours at a temperature of 0°C. The yield of the polymer is 5.5 g, which is 61 percent of theory. The polymer contains the theoretical quantity of double bonds. The intrinsic viscosity ($\eta$) at 25°C in benzene is 2.05 dl/g.

Example 8

A glass ampoule having a 50 ml capacity, and an atmosphere of argon, is filled with solutions of NN'-dimethyldichloroalane ethylenediamine ($3.2 \cdot 10^{-4}$ mole) in 10 ml of benzene, and dipyridindichlorodinitrozomolybdenum ($2 \cdot 10^{-4}$ mole) in 15 ml of benzene.

Then, 11.2 g of cyclooctene are added, and the polymerization is continued for seven hours at a temperature of 30°C. The yield of the polymer is 6.5 g, which is 58 percent of theory. The polymer contains the theoretical quantity of double bonds.

The intrinsic viscosity ($\eta$) in benzene at a temperature of 25°C is 1.70 dl/g.

Example 9

A glass ampoule having a 50 ml capacity, and an atmosphere of argon, is filled with solutions of a complex of iodoalane with diethyl ether ($3.4 \cdot 10^{-4}$ mole) in 10 ml of toluene, and iridium carbonylchloride ($2 \cdot 10^{-4}$ mole) in 15 ml of toluene. Then, 9 g of norbornene are added, and the polymerization is continued for 5 hours at a temperature of 25°C. The yeild of the polymer contains the theoretical quantity of double bonds. The intrinsic viscosity of the polymer ($\eta$) in benzene at 25°C is 1.90 dl/g.

Example 10

A glass ampoule having a 50 ml capacity, and an atmosphere of argon, is filled with $3.4 \cdot 10^{-4}$ mole of a complex of chloroalane with trimethylamine, and $2 \cdot 10^{-4}$ mole of tungsten hexachloride. Then, 15 g of cyclododecene are added, and the polymerization process is continued for 10 hours at a temperature of −30°C. The yield of the polymer is 9 g, which is 60 percent of theory. The polymer contains the theoretical quantity of double bonds. The intrinsic viscosity ($\eta$) of the polymer in benzene at 25°C is 1.05 dl/g.

What we claim is:

1. A method for preparing carbon to carbon chain linear homopolymers comprising bulk or solution polymerization of alicyclic compounds containing from 4 to 12 carbon atoms and from 1 to 4 double bonds in the ring, at a temperature of from −50° to +80°C in the presence of a catalyst consisting essentially of a transition metal compound of the general formula $M_n X_m Y_p Z_q$, where M is a transition metal selected from Group V–VIII of the periodic table, with X, Y, and Z being selected from the group consisting of halogen, NO, CO, P(OR)$_3$, PR$_3$, OR, C$_5$H$_5$N, C$_5$H$_5$, C$_6$H$_6$, C$_8$H$_{12}$, and where R is selected from the group consisting of alkyls, and aryls having from 1 to 20 carbon atoms, and halogen, where $n$ is from 1 to 4, $m$, $p$ and $q$ are from 0 to 8, and an aluminum compound having the formula $(AlH_b U_c)_d fP$, where U is selected from the group consisting of halogens and amines of the formula NR'$_2$ where R' is selected from the group consisting of hydrogen, alkyl, and aryl having from 1 to 20 carbon atoms, where P is selected from the group consisting of ether and teriary amine having from 2 to 20 carbon atoms, where $b$ is 1 or 2, $c$ is 3-$b$, $d$ is from 1 to 50, and $f$ is from 0 to $d$, the molar ratio of aluminum to the transition metal being from 0.1 to 30:1.

* * * * *